Nov. 30, 1937.   C. E. ELMORE   2,100,840
MOTOR VEHICLE LICENSING SYSTEM AND TAG THEREFOR
Filed Jan. 18, 1936
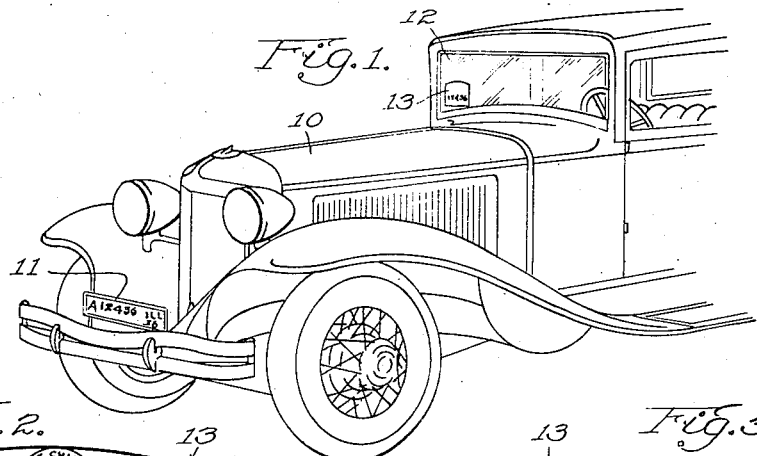
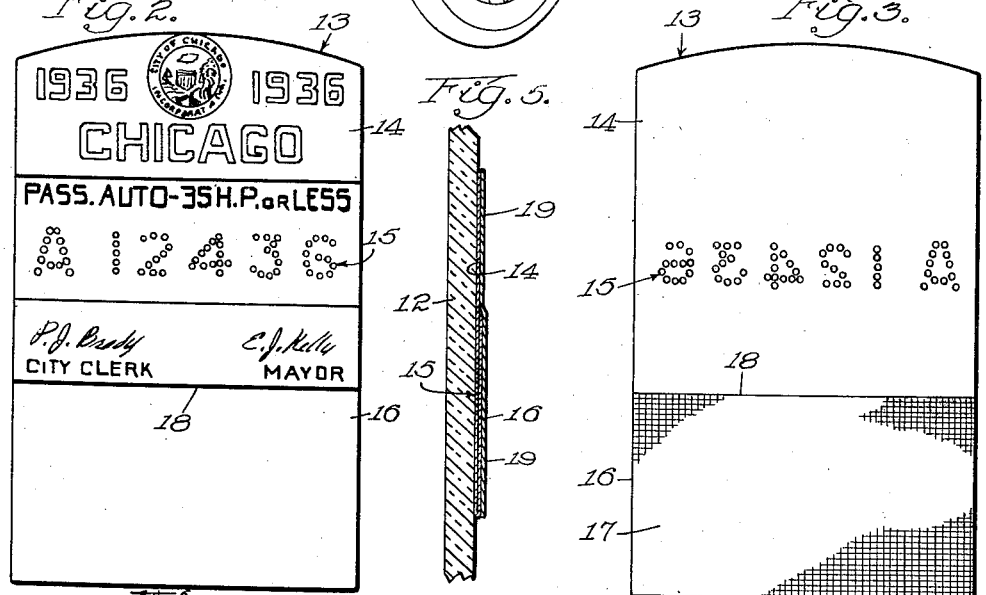
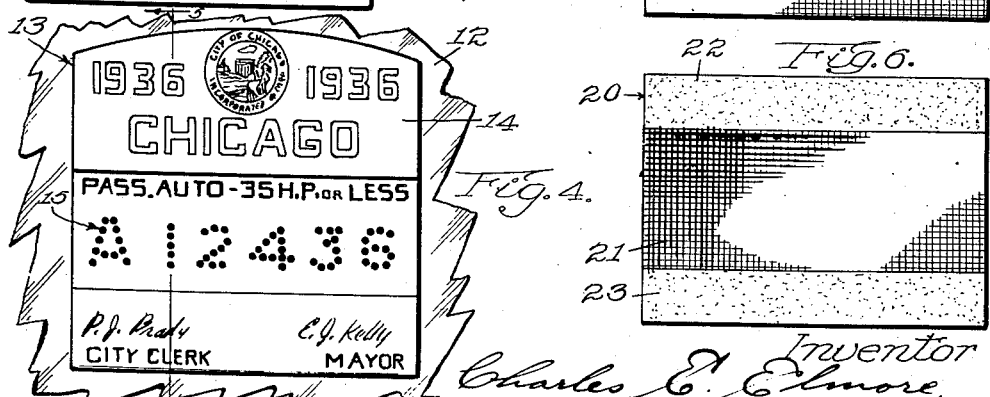
Inventor
Charles E. Elmore,
By Fisher, Clapp, Soans & Pond.
Attys.

Patented Nov. 30, 1937

2,100,840

UNITED STATES PATENT OFFICE 2,100,840

MOTOR VEHICLE LICENSING SYSTEM AND TAG THEREFOR

Charles E. Elmore, Chicago, Ill.

Application January 18, 1936, Serial No. 59,747

3 Claims. (Cl. 40—2.2)

One object of this invention is to provide an improved motor vehicle licensing system that will prevent, or at least render much more difficult, the theft of vehicle license plates and stickers in cities where an automobile is required to carry and display both a state license and a city license. Heretofore, so far as I am aware, the identifying numbers carried by state and city license plates or stickers have been different, so that neither has been in any way identified with the other, except that both carry the same year indicator. This has made it possible for either a stolen state license tag or a stolen city license tag to be used on another car without disclosing the fact of its unlawful re-use.

It has occurred to me that if the number, or other prominent identifying symbol, be made the same on both the state license tag and the city license tag carried by a car, efforts to defraud the law by theft would be rendered much more difficult, because a thief would have to steal both tags and re-use both tags on the same vehicle. If only one was stolen and re-used on another vehicle along with another tag bearing a different number or symbol the different numbers or symbols on the two tags would disclose the fact that at least one or the other of the two tags had been unlawfully acquired. Hence, one feature of the present invention resides in a pair of license tags for a motor vehicle, one being a state license tag and the other a municipal license tag the two bearing like identifying numbers or symbols and the two being preferably otherwise different in appearance.

At present city license tags commonly consist of a sticker in the form of a decalcomania film of a readily frangible character having imprinted on its face the year and place of issue, the identifying license number, and various other data, and this face is covered with an adhesive that, after the sticker has been moistened and applied to a wind shield glass and allowed to thoroughly dry, is insoluble to water, and is removed by the user at the end of the year by scraping it off the glass with a sharp knife, razor blade, or the like. However, license tag thieves have discovered that ether is a solvent for the sticker adhesive, and many thousands of such stickers have been removed intact by applying to the back of the decalcomania film a cloth dipped in ether which quickly loosens the film from the glass. This enables the sticker to be re-used in another car; but, to avoid detection of the theft by the original owner, or by police on his behalf, the original number on the sticker is usually obliterated and a different number substituted by pasting over the original number a paper strip of the same color as that portion of the sticker bearing the original number on which is printed the new or substituted number.

Another object of this invention has been to provide a means to balk this unlawful practice and to render more difficult the widely prevalent practice in large cities of purloining and re-using motor vehicle license plates and stickers.

An embodiment of this invention is illustrated in the accompanying drawing, in which Figure 1 is a perspective view of the forward portion of an automobile equipped with license tags in accordance with the invention.

Figure 2 is a front or face view of a city license tag or sticker.

Figure 3 is a rear view of the same.

Figure 4 is a front or face view of the sticker as applied to the glass of a wind shield and viewed through the latter.

Figure 5 is a vertical section on the line 5—5 of Figure 4.

Figure 6 illustrates a slight modification of the means for creating a black or dark backing for the perforated numerals of the sticker.

Referring to Figure 1, 10 designates the forward portion of an automobile, on the front fender of which is mounted a state license plate 11 bearing the state license number. Pasted on the inner surface of the lower right hand corner of the wind shield 12 is the city license sticker designated as an entirety by 13. It will be observed that the state license plate 11 and the city license sticker 13 both bear the same license number—in this case the arbitrarily chosen number 12,436 although in form and general appearance the two are distinctly different. This identity of state and city license numbers or other identifying symbols shows to a policeman or other observer that the car is properly equipped with state and city licenses. But if the officer notes that the state and city license tags bear different numbers, then the warrantable inference is that the car owner has come by one or the other unlawfully. Thus, to the extent that it takes more time and trouble to filch two license tags from a car than it does to filch one, this feature of my invention substantially lessens the possibility and likelihood of this type of fraud.

Describing now my improved city license tag, and referring to Figures 2 to 5, 14 designates a decalcomania film, on the face of which may be printed certain data showing year and place of issue, character of vehicle and horse power of motor, and names of city officials, etc., all as usual. But the important and distinctive feature is that the letters or numerals or both, making up the identifying license indicia. 15, are not printed across the face of the film as heretofore, but are cut therein, preferably by perforating the film in the outlines of the letters or numerals. And behind the perforated portion of the film, which is white or of a light color, is a black or other dark colored background which, of course, shows through the perforations and thus makes the letters or numerals stand out boldly in the form of dark dots, as shown in Figure 4. This dark background may be provided in a number of different ways. In Figures 2 and 3, 16 designates an extension of the film beneath the printed and perforated portion thereof, the rear side of which is printed, painted, or otherwise surfaced in a solid dark color—preferably black, as shown at 17 in Figure 3. This extension 16 is bent rearwardly and upwardly on the line 18, so that its blackened surface 17 lies behind the perforated characters of the film. It may be pasted to the back of the film, or, as indicated in Figure 5, it may be secured in folded position by the customary backing strip 19 that is secured to the back of the fragile film by an adhesive. In the customary decalcomania sticker this backing strip 19 is adhered by a water soluble paste, and directions are given to soak it and peel it off after the film has adhered to the glass and become thoroughly dry. But in the present case it may be allowed to remain to protect the film extension and keep it in place.

Instead of using the film extension 16 to provide the dark background for the perforated characters, a separate strip 20 of paper (Figure 6) may be used, this strip having a dark surface 21 to lie behind the perforations, and gummed edges 22 and 23 by which it may be secured to the back of the film after the backing strip 19 (if used) has been soaked and peeled off.

A thief can remove this sticker from the wind shield by the use of ether in the same way he removes the ordinary sticker, but he cannot alter the perforated license indicia thereon for re-use of the sticker under other and different license indicia, because, if he pastes over the original indicia a strip having different perforated indicia neither the original nor the substituted indicia will show up; and if he applies a strip having solid printed indicia, the latter will differ in style and appearance from the regulation indicia. Thus, in either case, the face of the sticker will reveal the fact that it has been tampered with.

While preferably the face of the sticker, or at least that part of it bearing the perforated license number or other identifying license indicia, will be in a light color, and the strip behind it will be in a dark color as above described, this may obviously be reversed; the point being that the two will be in contrasting colors, so that the license indicia will show up strongly through the perforations or other cut-outs in the film.

Hence, my invention provides a license sticker that cannot be altered for re-use with different license identifying numbers or other indicia.

Detail structural changes may be resorted to within the scope of the claims.

I claim:

1. A vehicle license sticker, comprising a decalcomania film having the license identifying indicia perforated therein, a background strip overlying the back of the perforated portion of said film, and means having an adhesive coating by which it is pasted to the back of said film for securing said strip in place, the face of the perforated portion of the film and the surface of the background strip covering the rear of said perforated portion being in contrasting colors.

2. A vehicle license sticker, comprising a decalcomania film having the license identifying indicia perforated therein, said film having an extension adapted to be folded to lie behind said perforated indicia, the face portion of said film carrying said perforated indicia and the rear surface of said extension being in contrasting colors.

3. A vehicle license sticker, comprising a decalcomania film having the license identifying indicia perforated in a light colored face portion thereof, said film having an integral extension below said indicia adapted to be folded to lie behind the latter, the rear surface of said extension bearing a dark color.

CHARLES E. ELMORE.